Patented Aug. 10, 1926.

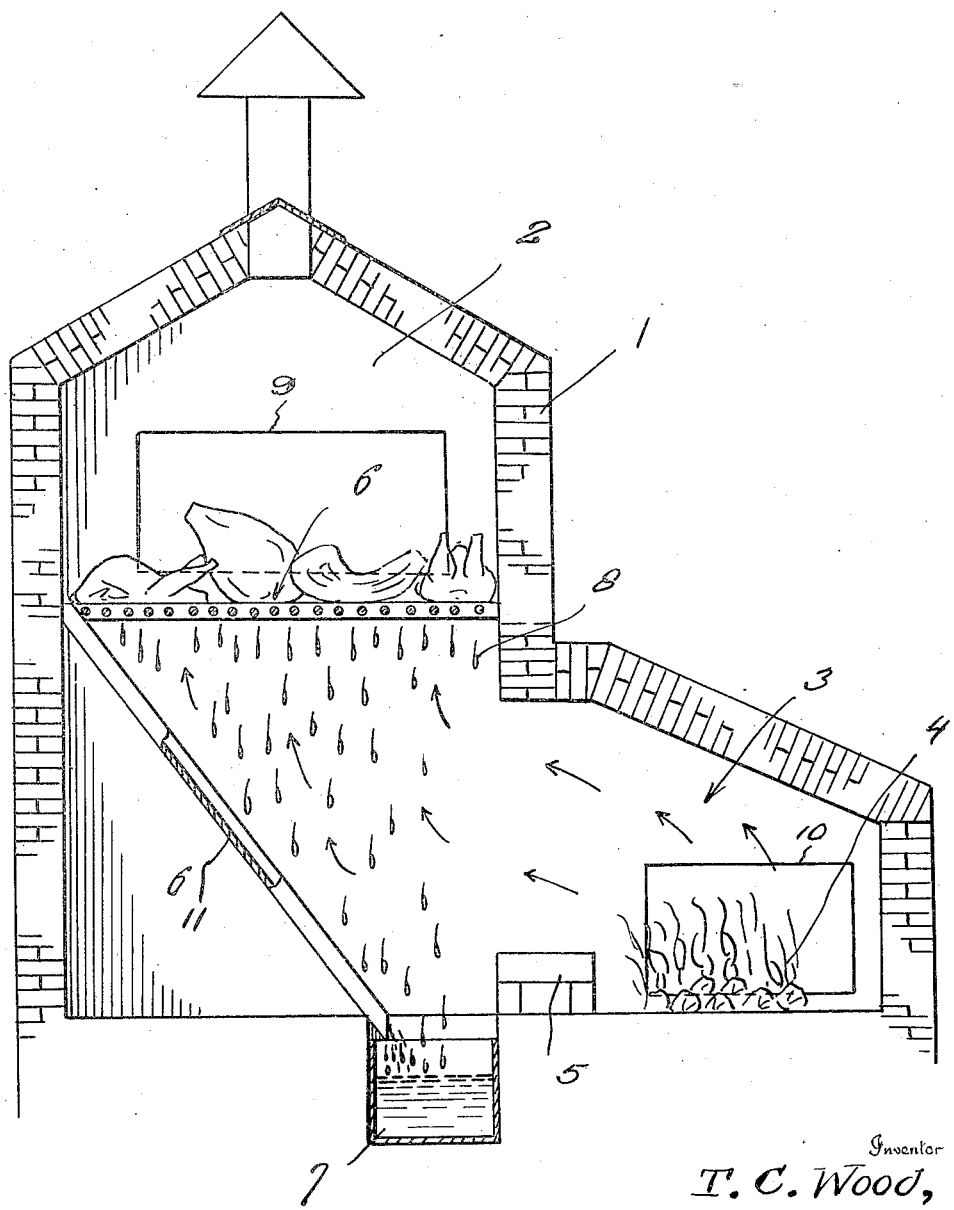

1,595,846

UNITED STATES PATENT OFFICE.

THOMAS CARLYLE WOOD, OF SAN FRANCISCO, CALIFORNIA, ASSIGNOR TO FAT BOY BARBECUE CABINS, INC., OF SAN FRANCISCO, CALIFORNIA, A CORPORATION OF CALIFORNIA.

BARBECUE OVEN.

Application filed July 7, 1925. Serial No. 42,032.

This invention relates to an improved oven structure which is designed especially for cooking meats "barbecue style."

The usual method of cooking meat in what is known as a barbecue pit is to build the fire directly beneath the meat. This, of course, means that the grease from the meat is permitted to drop directly onto the fire, thus producing obnoxious fumes, which are not only objectionable but which affect the flavor of the meat. This dropping grease also frequently causes the fire to increase in intensity to such an extent that even the meat itself catches fire, and is destroyed.

In accordance with the present invention a brick oven is built wherein the fire box is located off side, or rather on one side of and somewhat below the grid upon which the meat is rested, thereby obtaining an indirect, yet effective action of the flames and the heat from the fire.

An especially valuable feature of the invention is the device whereby the grease not only does not drop onto the fire, but is effectively disposed of, so that it cannot possibly come into contact with the fire, by a "grease catcher" or receiving pan.

Other features of the advantages of the invention will become apparent from the following description and drawings.

In the accompanying drawings forming a part of this application, and in which like numerals are employed to designate like parts throughout the same:

The figure represents an open view of the oven looking through the oven from the back to the front, the back wall being removed for the purpose of showing the inside construction of the same.

Referring to the drawing in detail, the reference character 1 indicates the wall of the oven within which wall is the chamber 2, the upper portion of which constitutes the oven proper wherein the meat is placed. The lower portion of the oven contains the chamber 3 wherein the fire 4 is built. If desired, a flame deflector 5 may be installed at the approximate point shown.

Supported in the oven is an appropriate grid 6, upon which the bodies of meat are placed as illustrated. Extending from one side of this grid downwardly is an inclined grease conducting trough 11, leading to a receiving pan 7. This trough is located beneath the grid 6, and it is obvious that the drippings 8 of the grease will drop into the receiving pan 7 itself, or onto the inclined portion of the trough 11, thereby rolling down into the receiving pan 7. The rising heat particles and flame however impinge upon the meat on the grate and serve to cook the same.

9 indicates the opening in the front of the oven through which the meat is placed on to the grid 6. 10 indicates an opening in the lower portion of the oven for the purpose of building the fire and removing the ashes.

Having thus described the invention, what is claimed is:—

1. An improved oven structure designed especially for cooking meats in barbecue style, the same comprising a structure constructed to provide an oven, a horizontal meat supporting and receiving grid disposed in said oven, a fire box at one side of and lower than said oven and supplying products of combustion thereto below the grid, a grease collecting pan disposed beneath one end portion of the grid and located at the bottom of the structure, a channel shaped trough leading downwardly from the opposite end portion of the grid in a manner to direct dripping grease into said pan.

2. An improved oven structure designed especially for cooking meats in barbecue style, the same being composed of bricks and constructed to provide a relatively high part having a roof provided with oppositely and downwardly inclined portions, a central smoke exit, and the upper portion of said part forming an oven, a horizontal meat supporting and receiving grid disposed in said oven, a fire box at one side of and lower than said oven and supplying products of combustion thereto below the grid, a grease collecting pan disposed beneath one end portion of the grid and located at the bottom of the structure, and a channel-shaped trough leading downwardly from the opposite end portion of the grid in a manner to direct dripping grease into said pan.

In testimony whereof I have affixed my signature.

THOMAS CARLYLE WOOD.